United States Patent
Hsiao

(10) Patent No.: US 7,217,362 B2
(45) Date of Patent: May 15, 2007

(54) WATER FILTER

(75) Inventor: Hao-Yao Hsiao, Taichung (TW)

(73) Assignee: Globe Union Industrial Corp., Taichung (TW)

( * ) Notice: Subject to any disclaimer, the term of this patent is extended or adjusted under 35 U.S.C. 154(b) by 401 days.

(21) Appl. No.: 10/788,279

(22) Filed: Mar. 1, 2004

(65) Prior Publication Data
US 2005/0189289 A1 Sep. 1, 2005

(51) Int. Cl.
*B01D 29/00* (2006.01)
*B01D 29/88* (2006.01)

(52) U.S. Cl. .................. 210/232; 137/801; 210/436; 210/449; 210/455; 210/456; 210/472

(58) Field of Classification Search .............. 210/232, 210/449, 456, 459, 460, 462, 463, 498, 436, 210/455, 472; 137/801; 285/8, 18, 19; 239/428.5
See application file for complete search history.

(56) References Cited

U.S. PATENT DOCUMENTS

| | | | |
|---|---|---|---|
| 2,382,066 A | * | 8/1945 | Klein .................... 239/436 |
| 5,769,326 A | | 6/1998 | Muchenberger et al. . 239/428.5 |
| 5,885,450 A | * | 3/1999 | Reid ..................... 210/232 |
| 2005/0098485 A1 | * | 5/2005 | Boyd et al. ................ 210/87 |
| 2005/0279697 A1 | * | 12/2005 | Stephenson et al. ....... 210/460 |

OTHER PUBLICATIONS

U.S. Appl. No. 60/507,990, filed Oct. 1, 2003, Boyd et al.*

* cited by examiner

*Primary Examiner*—Joseph Drodge
(74) *Attorney, Agent, or Firm*—Troxell Law Office, PLLC

(57) ABSTRACT

The present invention relates to a water filter including an outer connector, an inner connector, a flow control sheet and a strainer. A flange extends from the periphery of the upper surface of the outer connector with at least two protrusions extending therefrom. A plurality of guiding ribs is formed at the inner surface of the sidewall of the outer connector near the bottom surface of the outer connector and radiating from the center of the outer connector. A board is formed at the inner surface of the sidewall of the outer connector connecting with upper ends of the guiding ribs. A plurality of puncturing posts projects from the upper surface of the board. A rim extends from the periphery of the upper surface of the inner connector with at least two positioning cutouts being defined therein. The inner connector is received in the outer connector with the positioning cutouts respectively engagingly receiving the protrusions of the outer connector. A plurality of annular posts is formed in the inner connector with a plurality of guiding apertures being defined therethrough. The guiding apertures are above the puncturing posts of the outer connector. Thus, the water filter is ready to disassemble for cleaning and easy to assemble or disassemble in a DIY manner. Furthermore, the water filter is simple and for which a mold is ready to design and fabricate with low cost thereby facilitating to mass-produce.

5 Claims, 4 Drawing Sheets

WATER FILTER

BACKGROUND OF THE INVENTION

1. Field of the Invention

The present invention relates to a water filter, and particularly to a water filter which is used for connection with a faucet for leaching, guiding and saving water.

2. Prior Art

In general, a conventional water filter is connected to an outlet portion of a faucet for leaching, guiding and saving water. There are various structures or types of water filters. Referring to FIGS. 4–6, a conventional water filter mainly includes an outer connector 60, an inner connector, a flow control sheet 80 and a strainer 90 (Showed in FIG. 4).

A positioning post 61 is formed at the center of the outer connector 60 with one end near the bottom surface of the outer connector 60 and the other end projecting from the upper surface of the outer connector 60. A plurality of puncturing posts 62 is formed at the outer connector 60 about the positioning post 61 and is arranged in several circles with different diameters. The heights of the puncturing posts are gradually reduced along a direction away from the positioning post 61. A plurality of ribs 63 is formed at the inner surface of the sidewall of the outer connector 60 (Showed in FIG. 5).

A plurality of apertures 71 is evenly defined about the center of the inner connector 70. A plurality of cutouts 72 is defined in the outer surface of the sidewall of the inner connector 70 (Showed in FIG. 6). When the inner connector 70 is received in the outer connector 60, the cutouts 72 of the inner connector 70 engagingly receive and position the ribs 63 of the outer connector 60. The upper surfaces of the outer and inner connectors 60, 70 are coplanar (Showed in FIG. 4).

When the conventional water filter is attached to an outlet portion of a faucet (not shown) and the faucet is turned on, water will flow into the water filter, from the strainer 90, through the flow control sheet 80, into the apertures 71 of the inner connector 70, towards the puncturing posts 62 for piercing air bubbles in the water, and then out of the outer connector 60. Since the air bubbles in the water are pierced by the puncturing posts 62, the water flowing out of the outer connector 60 has no air bubbles and therefore is filtered. Thus, the water filter has a filtration function.

However, when it is desired to disassemble the water filter for cleaning after a period of time of use, the water filter cannot be detached directly by tools (not shown) since the inner and outer connectors 70, 60 are engaged with the cutouts 72 receiving the ribs 63 and the upper surfaces of the inner and outer connectors 70, 60 being coplanar. Maybe a sharp member (not shown) is used to extend through the bottom surface of the outer connector 60 and is applied with force to push the inner connector 70. However, the outer and inner connectors 60, 70 are not ready to detach since they are in tight engagement. Furthermore, since the inner and outer connectors 70, 60 are made of plastic, once the force is over applied, the outer and inner connectors 60, 70 are easy to be damaged, even adversely affect the function of the water filter. Thus, the conventional water filter is inconvenient for users to assemble or disassemble in a DIY manner, even not practical.

Moreover, the outer and inner connectors 60, 70 are complicated due to the configurations of the puncturing posts 62, the ribs 63 and the cutouts 72 and therefore a mold for the water filter is complicated too, which results in high manufacture cost. Thus, it is desired to improve the conventional water filter.

SUMMARY OF THE INVENTION

Accordingly, an object of the present invention is to provide a water filter which is ready to disassemble for cleaning and easy to assemble or disassemble in a DIY manner.

Further object of the present invention is to provide a water filter which is simple and for which a mold is ready to design and fabricate with low cost thereby facilitating to mass-produce.

To achieve the above-mentioned objects, a water filter in accordance with the present invention includes:

an outer connector, a flange extending from the periphery of the upper surface of the outer connector, at least two protrusions extending from the upper surface of the flange, a plurality of guiding ribs being formed at the inner surface of the sidewall of the outer connector near the bottom surface of the outer connector and radiating from the center of the outer connector, a board being formed at the inner surface of the sidewall of the outer connector connecting with upper ends of the guiding ribs, a plurality of puncturing posts projecting from the upper surface of the board;

an inner connector, a rim extending from the periphery of the upper surface of the inner connector, at least two positioning cutouts being defined in the rim, the inner connector being received in the outer connector with the positioning cutouts respectively engagingly receiving the protrusions of the outer connector;

a plurality of annular posts being formed in the inner connector, a plurality of guiding apertures being defined through the annular posts of the inner connector, the guiding apertures being above the puncturing posts of the outer connector;

a flow control sheet tightly engaging with the upper surface of the inner connector, a plurality of through holes being defined in the flow control sheet, a protruding portion projecting from the center of the flow control sheet, a plurality of recesses being defined in the protruding portion, an O-shaped ring being received in the recesses; and a strainer mounted on the upper surface of the flow control sheet, a plurality of finestras being defined in the strainer.

Wherein a positioning ring projects from the upper surface of the inner connector for tightly engaging with the flow control sheet.

Wherein the annular posts have different diameters and heights.

Wherein each puncturing post is in a triangular pyramid shape.

Wherein each finestra of the strainer is generally triangular.

Other objects, advantages and novel features of the present invention will be drawn from the following detailed embodiment of the present invention with attached drawings, in which:

DESCRIPTION OF THE PREFERRED EMBODIMENT

Figure 2:
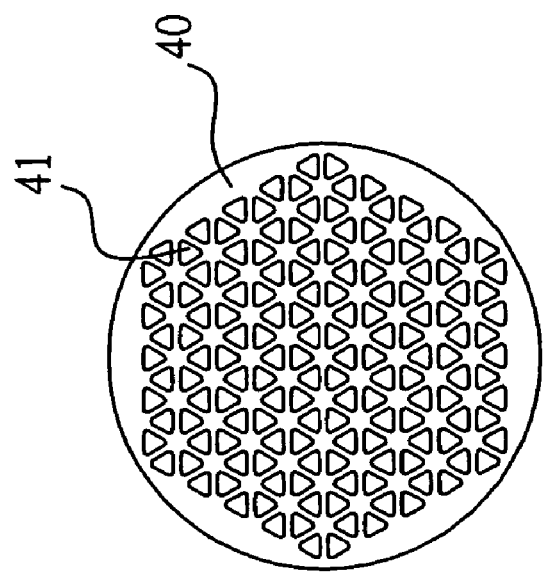
FIG. 2 is a top plan view of a strainer of the present invention.
Figure 1:
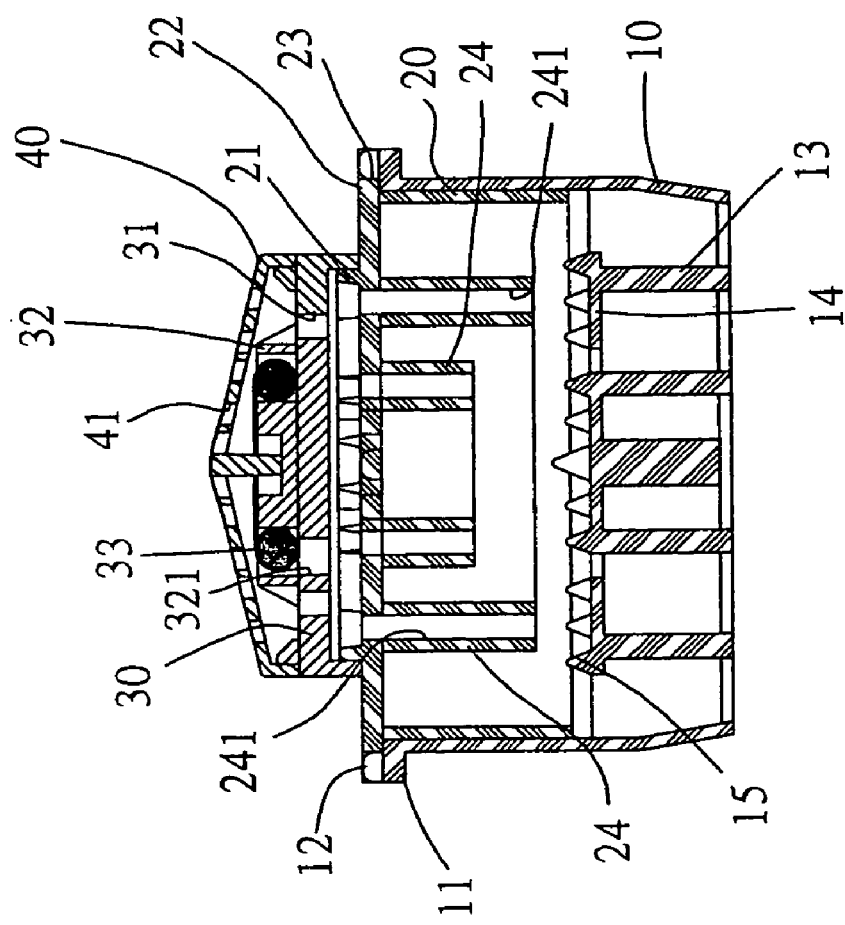
FIG. 1 is a cross-sectional view of a water filter of the present invention.

Referring to FIGS. 1–2, a water filter of the present invention includes:

an outer connector 10 made of resilient plastic, the outer connector 10 being generally hollow, a flange 11 extending from the periphery of the upper surface of the outer connector 10, at least two protrusions 12 symmetrically extending from the upper surface of the flange 11, a plurality of guiding ribs 13 being formed at the inner surface of the sidewall of the outer connector 10 near the bottom surface of the outer connector 10 and radiating from the center of the outer connector 10, a horizontal board 14 being formed at the inner surface of the sidewall of the outer connector 10 connecting with upper ends of the guiding ribs 13, a plurality of puncturing posts 15 each being in a triangular pyramid shape and projecting from the upper surface of the board 14;

an inner connector 20 made of resilient plastic, the inner connector 20 being generally hollow, a positioning ring 21 projecting from the upper surface of the inner connector 20, a rim 22 extending from the periphery of the upper surface of the inner connector 20, at least two positioning cutouts 23 being symmetrically defined in the rim 22, the positioning cutouts 23 respectively engagingly receiving the protrusions 12 of the outer connector 10 when the inner connector 20 is received in the outer connector 10;

two annular posts 24 extending downwardly from the upper wall of the inner connector 20 about the center of the inner connector 20 with different diameters and heights, a plurality of guiding apertures 241 being defined through the annular posts 24 of the inner connector 20 with even spacing, the guiding apertures 241 being above the puncturing posts 15 of the outer connector 10;

a flow control sheet 30 made of resilient plastic, the flow control sheet 30 tightly engaging with the outer surface of the positioning ring 21 of the inner connector 20, a plurality of through holes 31 being defined in the flow control sheet 30, a protruding portion 32 projecting from the flow control sheet 30, a plurality of recesses 321 being defined in the protruding portion 32, an O-shaped ring 33 being received in the recesses 321; and a strainer 40 made of resilient plastic, the strainer 40 being generally a conical sheet, a plurality of triangular finestras 41 being defined in the strainer 40 (see FIG. 2), the strainer 40 being mounted on the upper surface of the flow control sheet 30.

Figure 3:
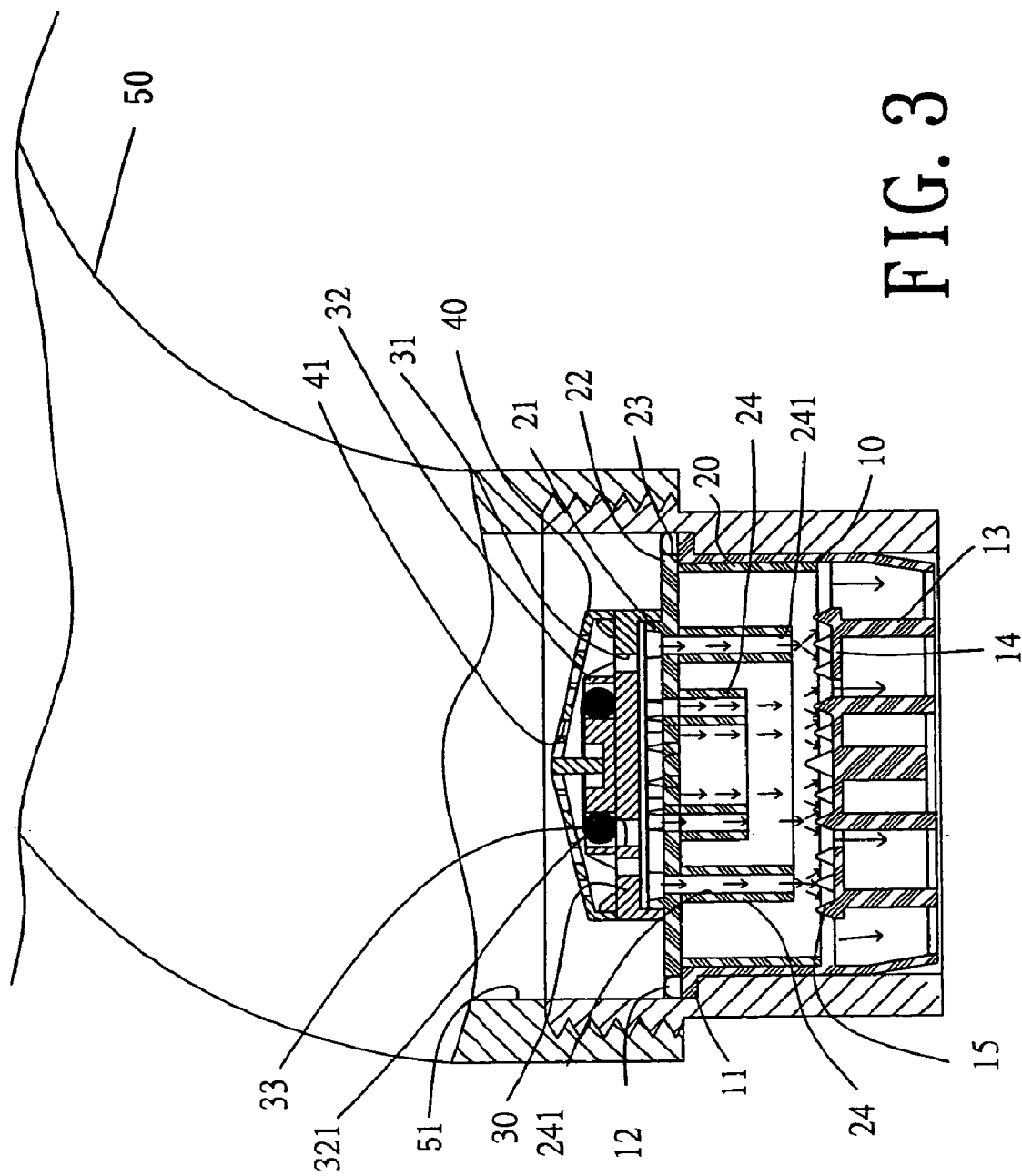
FIG. 3 is a cross-sectional view showing water flowing through the water filter of the present invention.
Figure 4:
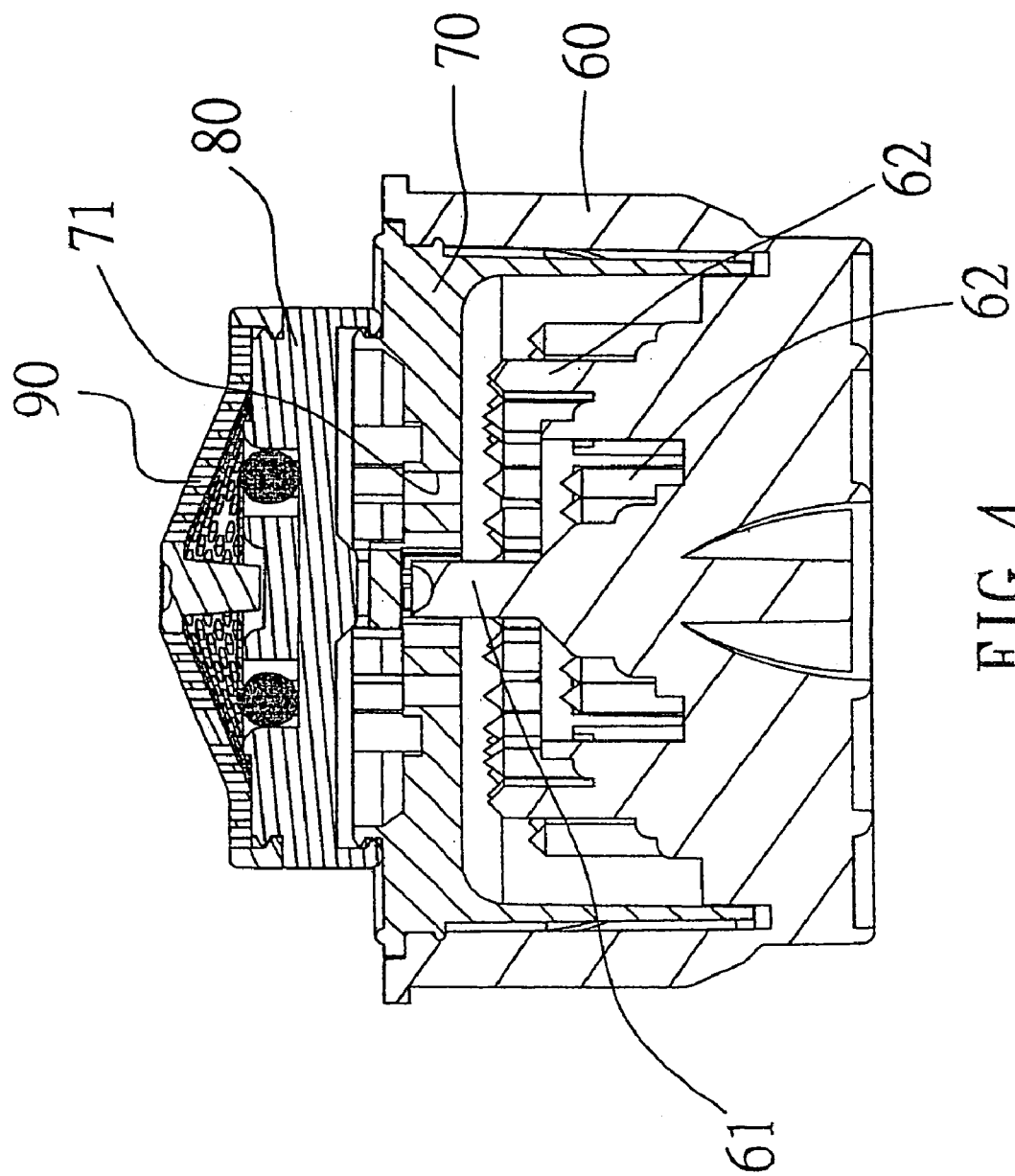
FIG. 4 is a cross-sectional view of a conventional water filter.
Figure 6:
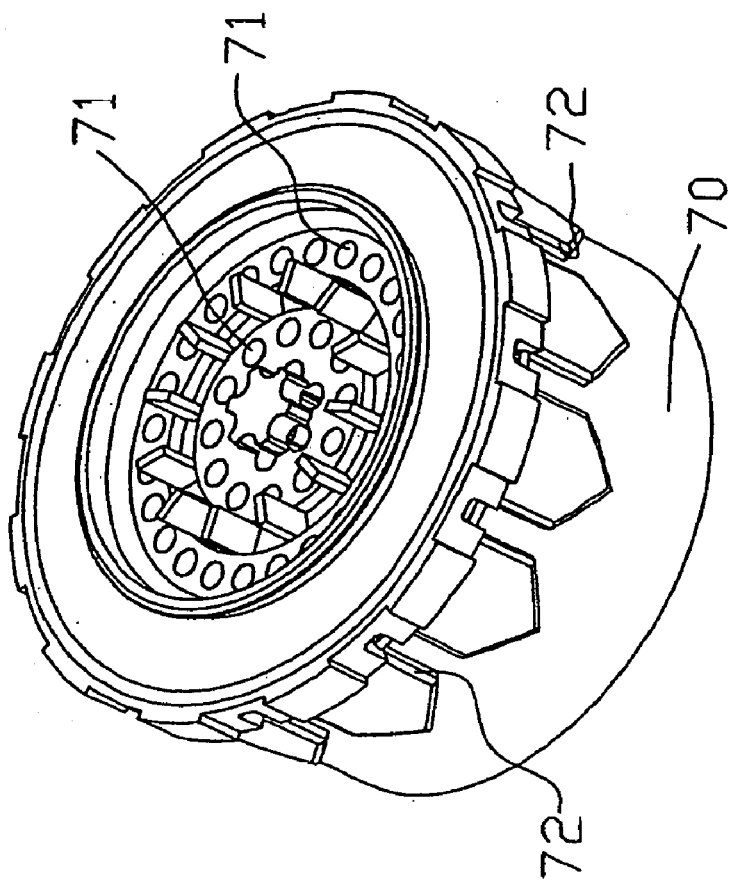
FIG. 6 is a perspective view of an inner connector of the conventional water filter.
Figure 5:
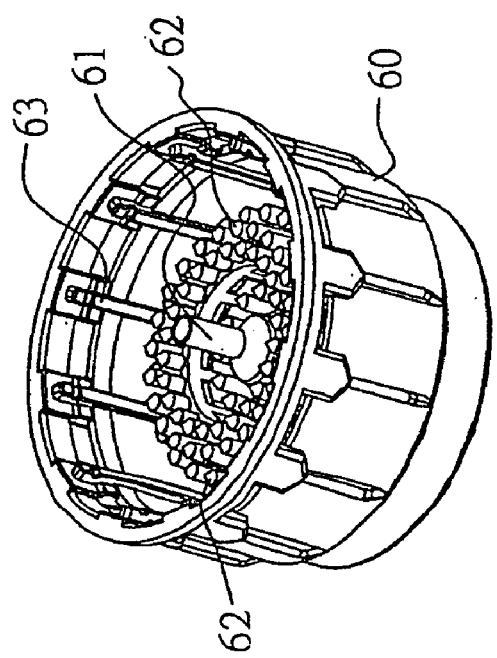
FIG. 5 is a perspective view of an outer connector of the conventional water filter.

Referring to FIGS. 1–3, after assembly, the water filter is attached to an outlet portion 51 of a faucet 50 (see FIG. 3).

When a user opens the faucet 50, water flows into the water filter of the present invention. Firstly, the water is primarily leached by the strainer 40. Then the water in turn flows through the recesses 321 and the through holes 31 of the flow control sheet 30, into the guiding apertures 241 of the annular posts 24 of the inner connector 20, to the puncturing posts 15 of the outer connector 10 for piercing air bubbles in the water (see FIG. 3) and along the guiding ribs 13 of the outer connector 10. Therefore, the water does not contain air bubbles therein and is transparent. Thus the water filter of the present invention has functions of leaching, guiding and saving water.

When it is desired to disassemble the water filter for cleaning after a period of time of use, the water filter can be detached directly from the outlet portion 51 of the faucet 50 and then can be disassembled to be separated parts of the strainer 40, the flow control sheet 30, the inner connector 20 and the outer connector 10.

Since the inner and outer connectors 20, 10 are engaged with the rim 22 of the inner connector 20 abutting against the flange 11 of the outer connector 10, and the positioning cutouts 23 of the rim 22 receiving the protrusions 12 of the flange 11, if desired, a user can directly insert a nail of his or her finger (not shown) between the rim 22 of the inner connector 20 and the flange 11 of the outer connector 10 thereby readily detaching the inner and outer connectors 20, 10 for cleaning. Thus, it is convenient for users to assemble or disassemble the water filter in a DIY manner, and therefore it is practical.

Moreover, the outer and inner connectors 10, 20 are relatively simple due to the configurations of the radiated guiding ribs 13, the horizontal board 14, the puncturing posts 15, and the annular posts 24. Therefore, a mold for fabricating the water filter of the present invention is relatively easy to design and fabricate, which results in low manufacture cost thereby facilitating to mass-produce.

As mentioned above, the water filter of the present invention is simple and ready to be assembled and disassembled.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A water filter comprising:
    a) an outer connector having:
        i) a flange extending outwardly from a periphery of an upper surface thereof;
        ii) at least two protrusions extending upwardly from an upper surface of the flange;
        iii) a plurality of guiding ribs located a predetermined distance from a center of an interior bottom of an interior thereof and extending upwardly from the interior bottom;
        iv) a board connecting with upper ends of the plurality of guiding ribs; and
        v) a plurality of puncturing posts projection upwardly from an upper surface of the board;
    b) an inner connector inserted into the interior of the outer connector an having:
        i) a rim extending outwardly from a periphery of an upper surface thereof;
        ii) at least two positioning cutouts, one of the at least two protrusions respectively engagingly receiving the at least two positioning cutouts;
        iii) a plurality of annular post extending downwardly from an interior thereof and being surrounded by a sidewall thereof; and
        iv) a plurality of guiding apertures located above the plurality of puncturing posts located on the board, one of the plurality of guiding apertures being defined through the plurality of annular posts;
    c) a flow control sheet engaging an upper surface of the inner connector and having:
        i) a plurality of through holes;

ii) a protruding portion projecting upwardly from a center thereof;

iii) a plurality of recesses located in the protruding portion; and iv) an O-shaped ring inserted into the plurality of recesses; and d) a strainer located on an upper surface of the flow control sheet and having a plurality of finestras located there through, wherein a water flow path is defined by a path extending through the plurality of finestras, the plurality of recesses, the plurality of through holes, the plurality of guiding apertures of the plurality of annular posts, the plurality of puncturing posts, and along the plurality of guiding ribs.

2. The water filter according to claim 1, further comprising a positioning ring projection from the upper surface of the inner connector, the flow control sheet engaging the positioning ring.

3. The water filter according to claim 1, wherein the plurality of annular posts have different heights and lengths.

4. The water filter according to claim 1, wherein each of the plurality of puncturing post has a triangular pyramid shape.

5. The water filter according to claim 1, wherein each of the plurality of finestra has a triangular cross section.

* * * * *